Aug. 6, 1963          N. L. CASE ETAL          3,100,270
              SUBMINIATURE ELECTRIC MOTOR
Original Filed Nov. 6, 1961                    3 Sheets-Sheet 1
FIG. 1
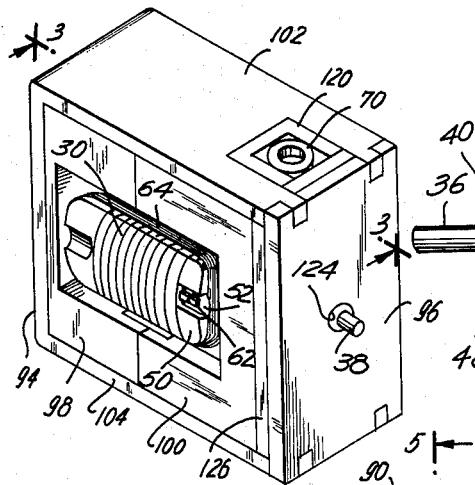
FIG. 2
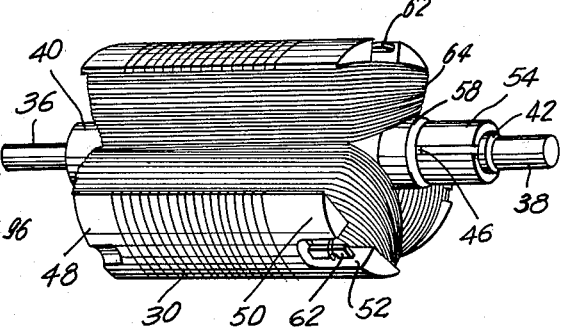
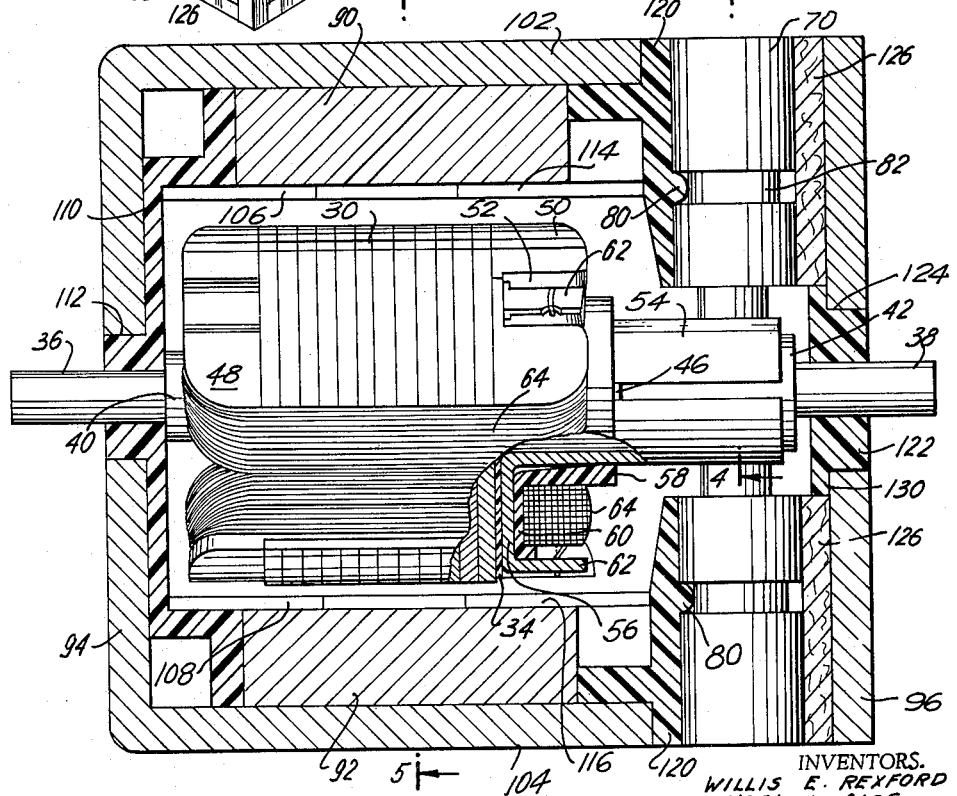
FIG. 3
INVENTORS.
WILLIS E. REXFORD
NOEL L. CASE
BY
ATTORNEYS

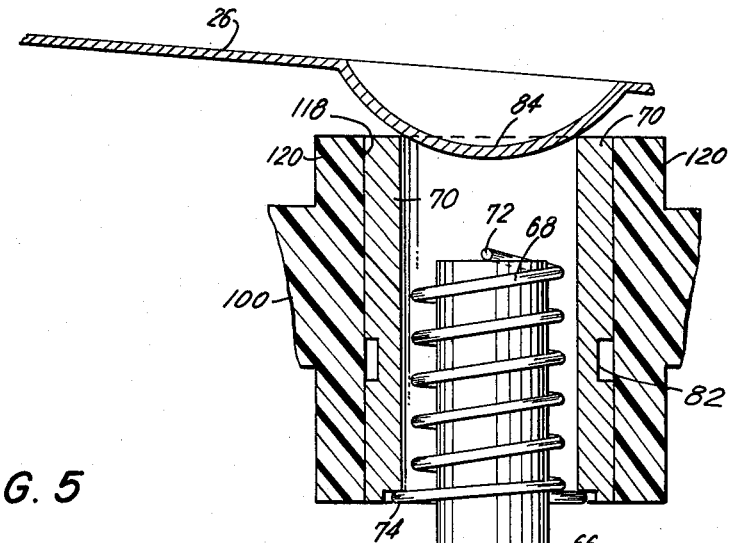
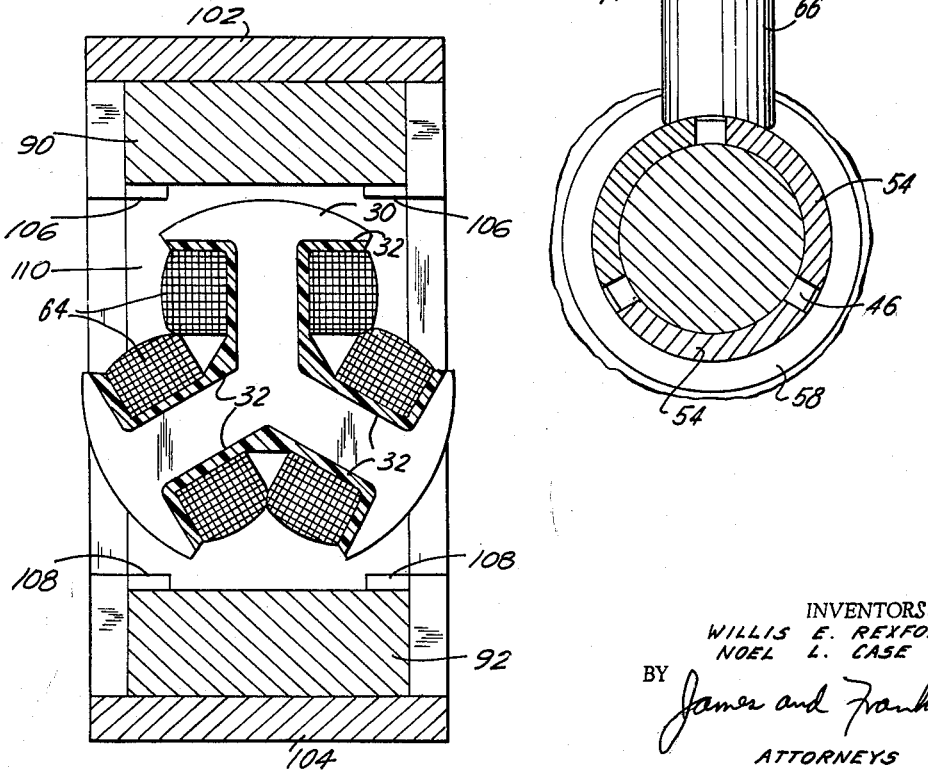

Aug. 6, 1963  N. L. CASE ETAL  3,100,270
SUBMINIATURE ELECTRIC MOTOR
Original Filed Nov. 6, 1961  3 Sheets-Sheet 3
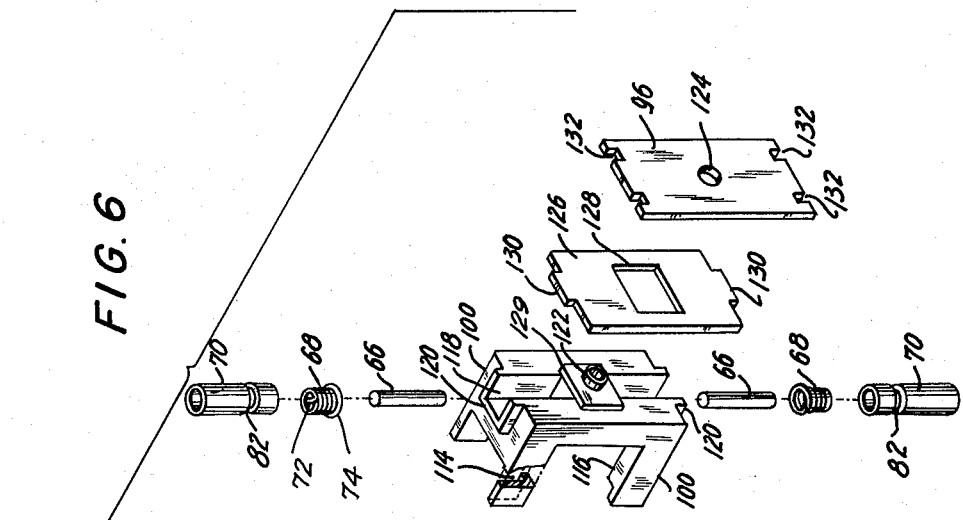
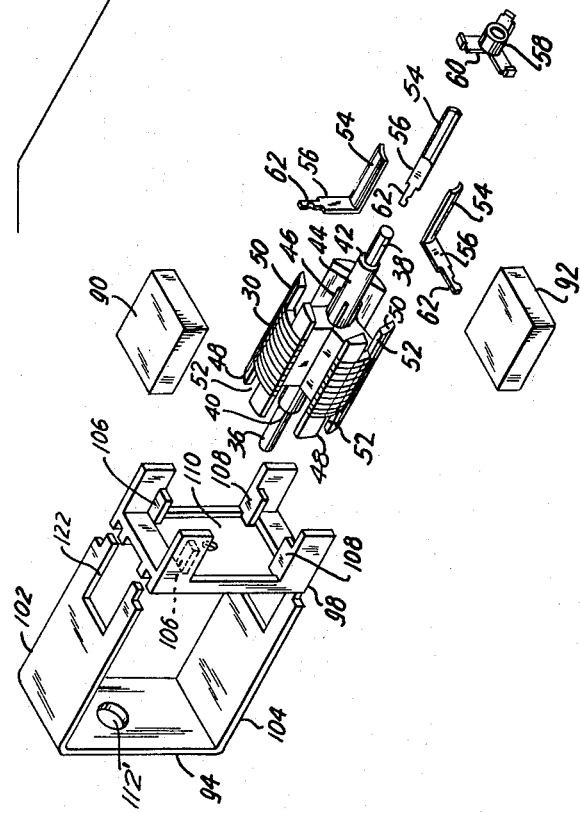
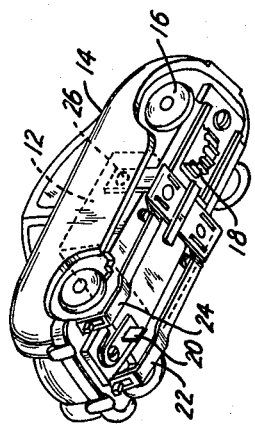
INVENTORS.
WILLIS E. REXFORD
NOEL L. CASE
BY James and Franklin
ATTORNEYS United States Patent Office 3,100,270
Patented Aug. 6, 1963

3,100,270
SUBMINIATURE ELECTRIC MOTOR
Noel L. Case and Willis E. Rexford, Girard, Pa., assignors to Louis Marx & Co., Inc., New York, N.Y., a corporation of New York
Original application Nov. 6, 1961, Ser. No. 150,375. Divided and this application Nov. 20, 1962, Ser. No. 239,126
19 Claims. (Cl. 310—154)

This invention relates to electric motors, and more particularly to a very small motor commonly called a "subminiature" motor.

When an electric motor is brought down to extremely small size, the conventional construction techniques used for motors, even of small size, are no longer practical. The general object of the present invention is to improve subminiature electric motors, and to provide such a motor with a different construction and assembly, such that the motor may be made at very low cost by mass production methods.

A further object is to provide such a motor which generates an unusually large amount of power relative to the size of the motor. Still another object is to provide such a motor which may be manufactured without critical tolerances or precision dimensioning of its parts. A further object is to provide a motor using permanent magnets which are simple slabs of rectangular shape, obtainable at minimum cost. Another object is to simplify the provision of external electrical connections to the motor.

The armature construction is not claimed herein, it being claimed in our parent application, Ser. No. 150,375, filed November 6, 1961, from which the present application has been divided.

To accomplish the foregoing general objects, and other more specific objects which will hereinafter appear, our invention resides in the motor elements and their relation one to another, as are hereinafter more particularly described in the following specification. The specification is accompanied by drawings in which:

FIG. 1 is a perspective view showing a subminiature electric motor embodying features of our invention;

FIG. 2 is a perspective view of the armature, commutator, and shaft assembly;

FIG. 3 is a section taken through the motor approximately in the plane of the line 3—3 of FIG. 1, and drawn to enlarged scale;

FIG. 4 is a fragmentary section through one of the brushes, and is taken approximately in the plane of the line 4—4 of FIG. 3, this being drawn to still larger scale;

FIG. 5 is a transverse section through the motor taken approximately in the plane of the line 5—5 of FIG. 3;

FIG. 6 is an exploded view drawn in perspective and showing the parts of the motor; and FIG. 7 is a perspective view showing a toy auto in which the motor is mounted for propulsion of the same.

Referring to the drawing, and more particularly to FIG. 1, the motor body there shown has a body dimension of only ⅜ inch by ¹¹⁄₁₆ inch by ¾ inch. The overall maximum length including the shaft extensions at each end, is only one inch.

Referring now to FIG. 7, the motor 12 is disposed in a toy vehicle 14 to propel the same. The motor is disposed horizontally, with its shaft extending in fore and aft direction. It drives the rear wheel 16 through gearing not shown, except for the final gear 18. This vehicle is used as part of a speedway toy, the vehicle being guided at its forward end by means of a guide finger 20 running in a guide groove. Power is supplied through metal power supply strips slidably engaged by contacts 22 and 24 which are pivoted at their ends, and insulated from one another. The road contact 24 leads to an upright spring contact 26 which bears against one side of the motor, and road contact 22 leads to a similar upright spring contact bearing against the opposite side of the motor. These upright contacts supply current to the motor in a manner described later.

The speedway may be supplied with current at a voltage of say 12 volts, and the motor, despite its small size, will accept this or even higher voltage, with consequent high power output relative to its exceedingly small dimensions. In consequence, the vehicle may be driven at high speed, appropriate for a racing car.

Referring now to FIG. 6 of the drawing, the armature and shaft assembly comprises ferrous laminations 30 which provide armature poles, there being three in the present case. A body of plastics material is molded directly around the laminations 30, and referring to FIG. 5, this body provides insulation lining in the slots of the armature, as is shown at 32. Referring to FIG. 3, this insulation material is also carried around the ends of the laminations, as shown at 34. It further provides shaft ends 36 and 38 which are preferably stepped in diameter, as shown at 40 and 42, to act as thrust bosses. Reverting to FIG. 6, the insulation body also provides a commutator segment locating cylinder 44 with ridges 46. It further provides end extensions of the armature poles, shown at 48 and 50. In the present case the armature has three poles, and there are three extensions at each end, but each extension is preferably centrally slotted as shown at 52.

The commutator is made of somewhat L-shaped segments, shown at the right of the armature body in FIG. 6. There are three commutator segments 54 of arcuate cross section, and each has a soldering post 56 bent radially outward therefrom. The segments 54 are placed about the cylinder 44 between the ridges 46, with the posts 56 extending along the insulation end surface of the armature body.

An insulation piece, which may for convenience be called a "spider," is provided to hold the commutator segments. The spider comprises a collar 58 which may be slid over the segments 54, and radial parts 60 which then lie outside the metal soldering posts 56 and provide an insulation covering for the same. At this time the posts 56 extend through the slots 52 of the armature extensions 50 previously referred to. The radius of the posts then is substantially greater than that of the armature, by an amount roughly indicated by the reduced end portions 62 of the posts 56.

The windings indicated at 64 in FIG. 2 are then applied. No attempt has been made to show the windings in FIG. 6. The windings fill the armature slots, substantially as shown in FIG. 5, and there is room for a substantial number of turns. The winding also fills the spaces at the ends of the armature beneath the extensions 48 and 50, and the said extensions are provided to protect and to help hold the windings in position.

It is important to note that the wire is wound about the soldering posts 56 and also the insulation radial posts 60 of the spider, thus additionally holding all of these parts in assembled relation. The ends of the windings are soldered to the ends 62 of the soldering posts, which is readily done because these parts then project outward and are fully exposed. Finally the thinned end portions 62 of the soldering posts are bent to a position substantially parallel to the shaft, as shown at 62 in FIGS. 2 and 3, thus bringing the same within the radius of the armature. The bent part of the post is protectively housed in the slots 52 of the extensions 50 previously referred to.

To supply current to the armature there are two diametrically opposed brush assemblies. Each brush assembly includes a brush 66 (FIG. 4), a brush spring 68, which fits around the brush, and a tubular metal brush holder 70 dimensioned to receive the brush and spring. The outer end 72 of the spring extends diametrically and bears against the outer end of the brush, and the inner end of the spring is expanded to larger diameter to bear against the inner end of the tubular holder 70 as shown at 74. Thus the spring acts as a pull spring, rather than a push spring, and urges the brush 66 against the commutator segments 54.

The brush holder is itself held by insulation means shown at 120 and 126 in FIG. 3, including a ridge 80 which enters an annular slot 82 of brush holder 70 to lock it against axial movement. The outer end of the metal brush holder 70 is exposed at the outside of the motor to receive the indented end 84 (FIG. 4) of a spring contact 26 which supplies power to the motor. This is the contact previously referred to at 26 in FIG. 7, and it will be understood that there is a similar contact at the opposite side of the motor for connection to the opposite brush holder. Current flows through the brush holder 70 and springs 68 to the brush 66, and thence to the commutator segments 54.

Reverting to FIG. 6, the field is provided by a pair of permanent magnets 90 and 92 disposed on opposite sides of the armature. These may be simple flat rectangular slabs of a highly magnetic material. An alloy such as Alnico may be employed, but in the present case the magnets are ceramic magnets. The direction of magnetism is between the flat faces, that is, in the direction of the shortest dimension of the slab. Thus, if the top of magnet 90 is south, the bottom face adjacent the armature is north, and the magnet 92 then is positioned with its south pole on top or adjacent the armature, and with its north pole at the bottom. They could both be reversed.

The magnetic circuit is completed by a ferrous yoke 94 and an end plate 96, which parts also act as the outside frame and casing of the motor. However, the assembly is completed and is greatly facilitated by the use of molded retainers 98 and 100, which are molded in desired shape out of a suitable plastics material. The part 98 is received between the arms 102 and 104 of yoke 94, and it has small shelf-like ledges 106 near the top which receive one end of upper magnet 90. There are similar ledges 108 near the bottom which receive one end of the lower magnet 92. The outer faces of the magnets are attracted to and bear directly against the ferrous metal of the yoke. The end wall 110 of retainer 98 has a bearing 112 (FIG. 3) for the armature shaft 36. The iron yoke 94 (FIG. 3) has a hole dimensioned to receive the outside of the bearing 112. The hole is also shown at 112' in FIG. 6.

Reverting to FIG. 6, the other plastics retainer 100 similarly has upper ledges 114 to support one end of magnet 90, and lower ledges 116 to support one end of magnet 92. The retainer is deeply channelled at 118 to receive the tubular metal brush holders 70, and the bottom wall of the channel has two transverse ridges (not visible in FIG. 6) corresponding to the ridge 80 shown in FIG. 4 to hold the brush holders against axial movement. There is a peripheral projection 120 (FIG. 6) around the channel 118 at the top and bottom of the retainer, which is received in and which lines mating slots 122 at the ends of the yoke arms 102 and 104. This insulation lining is also shown at 120 in FIGS. 3 and 4.

The retainer 100 (FIG. 6) is completed by a bearing 122 for the armature shaft, and this is received in a mating hole 124 in ferrous end plate 96. The latter is lined with a piece of sheet insulation 126, and this may be cut away as shown at 128, to fit around a wall 129 which carries the bearing 122. The insulation strip 126 preferably has projections 130 at the top and bottom to complete the insulation around the outer ends of the brush holders. These projections 130 complement the insulation rim 120 previously referred to.

The ferrous end plate 96 is notched at 132, and the ends of the yoke are correspondingly shaped to provide tongues which are matingly received in the notches 132. The assembly then may be completed by staking, that is, the interfitting tongues may be struck and expanded somewhat to lock the parts in the assembled relation shown in FIG. 1.

In the particular motor shown, the winding employs 350 turns of #40 wire for each pole. The wire is plastic coated copper wire. The three windings are delta connected. This is for use at 12 volts, but the motor is usable over a wide range of from 4 to 18 volts.

The armature laminations 30 are stamped out of conventional ferrous metal used for this purpose, and commonly referred to as electrical steel sheet. However, the armature core also may be made of sintered iron or an iron slug. The plastics material used is preferably nylon. The yoke 94 and end plate 96 for the magnetic circuit may be stamped out of electrical steel sheet. The commutator segments may be made of copper, preferably hardened for better wear. The brush is made of graphite, and the brush holder may be made of brass tubing. The magnet retainers, the armature body and shaft, and the spider, are molded out of nylon. The insulation sheet 126 may be stamped out of sheet fiber or other sheet insulation material.

It is believed that the construction and method of assembly of our improved subminiature electric motor, as well as the advantages of the same, will be apparent from the foregoing detailed description. The insulation parts are molded in final form in a production molding operation. The metal parts are stampings. The assembly is quick and easy. The only soldering needed is to the ends of the soldering posts, which then are fully exposed to facilitate the soldering operation. The magnets may be simple rectangular slabs, obtainable at minimum cost. The armature accepts a large amount of winding relative to its size, and the motor therefore may be wound to operate at a relatively high voltage, with corresponding substantial power output, considering the small size of the motor. The motor operates successfully over a wide range of voltage.

It will be understood that while we have shown and described the invention in a preferred form, changes may be made in the structure shown, without departing from the scope of the invention as sought to be defined in the following claims.

In the claims, the words "top," "bottom," and "upright" are used in a relative sense, because the motor may be used in any desired position. For example, in the toy auto shown in FIG. 7 the motor is used in horizontal position.

We claim:

1. A motor comprising an armature and commutator rotatable in a permanent magnet field, and brush assemblies, each brush assembly including a brush, a tubular metal brush holder having a diameter substantially larger than that of the brush, a helical pull spring having a diameter intermediate that of the brush and brush holder, said spring being housed within the brush holder and around the brush with the outer end of the spring bearing against the outer end of the brush and its inner end bearing against the inner end of the tubular holder, and insulation means surrounding and holding the metal brush holder.

2. A subminiature electric motor comprising an armature and commutator rotatable in a permanent magnet field, and brush assemblies, each brush assembly including a brush, a tubular metal brush holder having a diameter substantially larger than that of the brush, a helical pull spring having a diameter intermediate that of the brush and brush holder, said spring being housed within the brush holder and around the brush with the outer end of the spring bearing against the outer end of the brush and its inner end bearing against the inner end of the tubular holder, and insulation means surrounding and holding the metal brush holder, the outer ends of said brush holders being exposed for engagement by two external contact springs pressing toward one another against the outer ends of the brush holders for electrical connection to the brushes.

3. A motor including an armature, commutator, shaft, and field, said field comprising two permanent field magnets, a ferrous sheet metal yoke bent to rectangular U shape, plastic retainer means disposed within and supported by said yoke, said retainer means extending from one arm of the yoke to the other, and providing locating supports for the two permanent field magnets, and also providing a bearing for the armature shaft, said retainer means having passages for receiving brush holders, one of said magnets contacting one arm of said yoke and the other magnet contacting the other arm of said yoke, the armature being disposed between said magnets to complete the magnetic circuit.

4. A motor including an armature, commutator, shaft, and field, said field comprising a ferrous sheet metal yoke bent to rectangular U shape, plastic retainers disposed within and supported by said yoke, said retainers providing supports for permanent field magnets and also providing bearings for the armature shaft, one of said retainers having passages for receiving brush holders, and a ferrous end plate secured to the ends of the yoke to complete the magnetic circuit and to complete the outside frame of the motor.

5. A subminiature electric motor including an armature, commutator, shaft, and field, said field comprising a ferrous sheet metal yoke bent to rectangular U shape, plastic retainers disposed within and supported by said yoke, said retainers providing supports for rectangular permanent field magnets and also providing bearings for the armature shaft, one of said retainers having passages for receiving metal brush holders, sheet insulation outside brush holders, and a ferrous end plate outside said sheet insulation and secured to the ends of the yoke to complete the magnetic circuit and to complete the outside frame of the motor, the middle of the yoke and the end plate having holes dimensioned to receive the outside of the aforesaid insulation bearings for the motor shaft.

6. A motor as defined in claim 5, in which the brush holder is part of a brush assembly, each brush assembly including a brush, a tubular brush holder, and a pull spring around the brush with its outer end bearing against the outer end of the brush and its inner end bearing against the inner end of the tubular holder.

7. A subminiature electric motor as defined in claim 5, in which the brush holder is part of a brush assembly, each brush assembly including a brush, a tubular metal brush holder, a pull spring around the brush with its outer end bearing against the outer end of the brush and its inner end bearing against the inner end of the tubular holder, the outer end of said brush holder being exposed for engagement by an external contact spring for electrical connection to the brush.

8. A motor designed for use in a toy having two leaf contact springs spaced apart to receive the motor therebetween for electrical connection thereto, said motor comprising a permanent magnet field, an armature and commutator rotatable in said permanent magnet field, two brush assemblies disposed in diametrical relation, each brush assembly including a brush, a tubular metal brush holder, a spring urging the brush toward the commutator, and insulation means holding the tubular metal brush holder intermediate its ends, the outer ends of said tubular metal brush holders being exposed for direct engagement by said two external contact springs with said springs pressing toward one another against the outer ends of the brush holders for electrical connection thereto said motor being devoid of any electrical connection thereto other than the aforesaid two external contact springs.

9. A motor including an armature, commutator, shaft, and field, said field comprising a ferrous sheet metal yoke bent to rectangular U shape, plastic retainer means disposed within and supported by said yoke, said retainer means providing supports for permanent field magnets, and also providing a bearing for the armature shaft, said magnets contacting said yoke to complete the magnetic circuit, said retainer means having passages for receiving tubular metal brush holders, a brush in each tubular brush holder, and a pull spring around the brush with its outer end bearing against the outer end of the brush and its inner end bearing against the inner end of the tubular brush holder.

10. A motor including an armature, commutator, shaft, and field, said field comprising a ferrous sheet metal yoke bent to rectangular U shape, plastic retainer means disposed within and supported by said yoke, said retainer means providing supports for permanent field magnets, and also providing a bearing for the armature shaft, said magnets contacting said yoke to complete the magnetic circuit, said retainer means having passages for receiving tubular metal brush holders, a brush in each tubular brush holder, a pull spring around the brush with its outer end bearing against the outer end of the brush and its inner end bearing against the inner end of the tubular brush holder, the outer end of said brush holders being exposed for engagement by external contact springs for electrical connection to the brushes.

11. A motor including an armature, commutator, shaft, and field, said field comprising two permanent field magnets in the form of rectangular blocks, a ferrous sheet metal yoke bent to rectangular U shape, a ferrous end plate secured to the ends of the yoke to complete a rectangular open-sided outside frame for the motor, two U-shaped plastic retainers disposed with their arms end-to-end to form a rectangle which fills the ferrous rectangular frame and which leaves a space for the armature and commutator, the abutting ends of the arms of the retainers being cut back to provide a rectangular space at the top receiving one permanent magnet contacting the top of the frame, and a similar rectangular space at the bottom receiving the other permanent magnet contacting the bottom of the frame.

12. A motor including an armature, commutator, shaft, and field, said field comprising two permanent field magnets in the form of rectangular blocks, a ferrous sheet metal yoke bent to rectangular U shape, a ferrous end plate secured to the ends of the yoke to complete a rectangular open-sided outside frame for the motor, two open-sided U-shaped plastic retainers disposed with their arms end-to-end to form a rectangle which fills the ferrous rectangular frame and which leaves an open-sided space for the armature and commutator, the abutting ends of the arms of the retainers being cut back to provide a rectangular space at the top receiving one permanent magnet contacting the top of the frame, and a similar rectangular space at the bottom receiving the other permanent magnet contacting the bottom of the frame, the upright portion of the retainer at the commutator end of the shaft having upright passages above and below the shaft for receiving brush holders.

13. A motor including an armature, commutator, shaft, and field, said field comprising two permanent field magnets in the form of rectangular blocks, a ferrous sheet metal yoke bent to rectangular U shape, a ferrous end plate secured to the ends of the yoke to complete a rectangular open-sided outside frame for the motor, two U-shaped plastic retainers disposed with their arms end-to-end to form a rectangle which fills the ferrous rectangular frame and which leaves a space for the armature and commutator, the abutting ends of the arms of the retainers being cut back to provide a rectangular space at the top receiving one permanent magnet contacting the top of the frame, and a similar rectangular space at the bottom receiving the other permanent magnet contacting the bottom of the frame, one of said retainers providing a bearing for one end of the armature shaft, the other of said retainers providing a bearing for the other end of the armature shaft, the upright portion of the retainer at the commutator end of the shaft having upright passages above and below the shaft for receiving brush holders.

14. A motor including an armature, commutator, shaft, and field, said field comprising two permanent field magnets in the form of rectangular blocks, a ferrous sheet metal yoke bent to rectangular U shape, a ferrous end plate secured to the ends of the yoke to complete a rectangular open-sided outside frame for the motor, two open-sided U-shaped plastic retainers disposed with their arms end-to-end to form a rectangle which fills the ferrous rectangular frame and which leaves an open-sided space for the armature and commutator, the abutting ends of the arms of the retainers being cut back to provide a rectangular space at the top receiving one permanent magnet contacting the top of the frame, and a similar rectangular space at the bottom receiving the other permanent magnet contacting the bottom of the frame, one of said retainers providing a bearing for one end of the armature shaft, the other of said retainers providing a bearing for the other end of the armature shaft, the middle of the yoke and of the end plate having holes dimensioned to receive the outside of the said bearings, the upright portion of the retainer at the commutator end of the shaft having upright passages above and below the shaft for receiving brush holders.

15. A motor including an armature, commutator, shaft, and field, said field comprising two permanent field magnets in the form of rectangular blocks, a ferrous sheet metal yoke bent to rectangular U shape, rectangular U-shaped plastic retainer means disposed with its arms within the arms of the ferrous rectangular yoke to fill the ferrous rectangular yoke and which leaves a space for the armature and commutator, the arms of the retainer means being cut back to provide a rectangular space at the top receiving one permanent magnet contacting the top of the yoke, and a similar rectangular space at the bottom receiving the other permanent magnet contacting the bottom of the yoke, said retainer means providing a bearing for one end of the armature shaft.

16. A motor including an armature, commutator, shaft, and field, said field comprising two permanent field magnets in the form of rectangular blocks, a ferrous sheet metal yoke bent to rectangular U shape, rectangular open-sided U-shaped plastic retainer means disposed with its arms within the arms of the ferrous rectangular yoke to fill the ferrous rectangular yoke and which leaves an open-sided space for the armature and commutator, the arms of the retainer means being cut back to provide a rectangular space at the top receiving one permanent magnet contacting the top of the yoke, and a similar rectangular space at the bottom receiving the other permanent magnet contacting the bottom of the yoke, said retainer means providing a bearing for one end of the armature shaft, the upright portion of the retainer means at the commutator end of the shaft having upright passages above and below the shaft for receiving brush holders.

17. A motor as defined in claim 1 in which the outer end of the spring extends over the outer end of the brush, and in which the innermost coil of the spring is enlarged in diameter relative to the body of the spring in order to bear against the inner end of the brush holder, and in which the body of the spring envelops the outer end of the brush for a substantial part of the length of the brush and thereby positions the brush against lateral movement.

18. A motor as defined in claim 12 in which the upright passages for the brush holders are channels which are open on the side facing the ferrous end plate, and in which the inside face of the ferrous end plate is lined with a sheet of insulating material to close the open side of the passages.

19. A motor as defined in claim 12 in which the upright passages for the brush holders are channels which are open on the side facing the ferrous end plate, and in which the inside face of the ferrous end plate is lined with a sheet of insulating material to close the open side of the passages, and in which the brush holders are metal tubes, and in which the plastic retainer and the tubes have inter-engaging means to prevent axial movement of the tubes.

References Cited in the file of this patent

UNITED STATES PATENTS

| 651,326 | Fowler | June 5, 1900 |
| 2,177,472 | Barrett | Oct. 24, 1939 |
| 2,348,684 | Perkins | May 9, 1944 |
| 2,516,608 | Wightman | July 25, 1950 |
| 2,748,302 | Boeckel | May 29, 1956 |

FOREIGN PATENTS

| 13,422 | Austria | Sept. 25, 1903 |
| 188,895 | Great Britain | Nov. 23, 1922 |
| 448,007 | France | Nov. 14, 1912 |